Oct. 21, 1952     J. H. COOTE ET AL     2,614,452
LIGHT-DIVIDING SYSTEM
Filed Dec. 27, 1949     2 SHEETS—SHEET 2
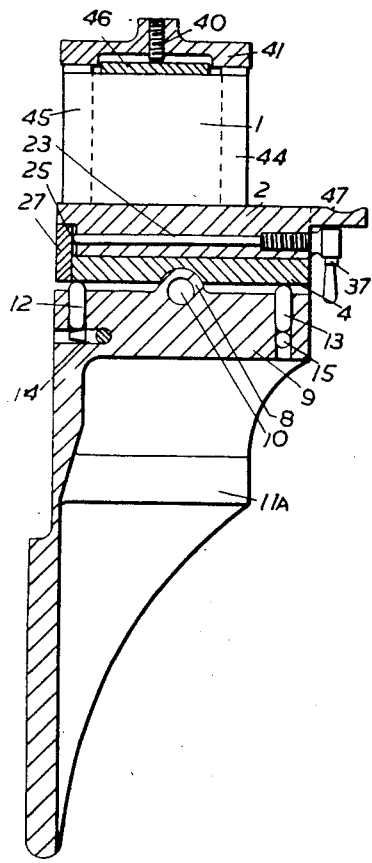
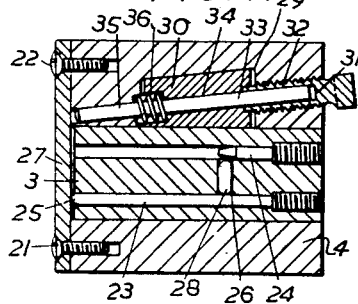
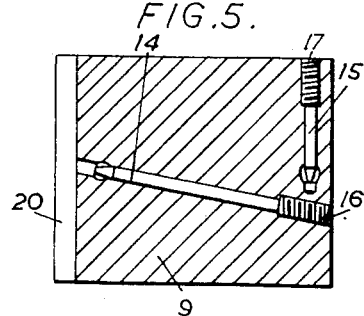
Inventor
JACK HOWARD COOTE
GILBERT MURRAY
By Wenderoth,
Lind & Ponack
Attorneys Patented Oct. 21, 1952

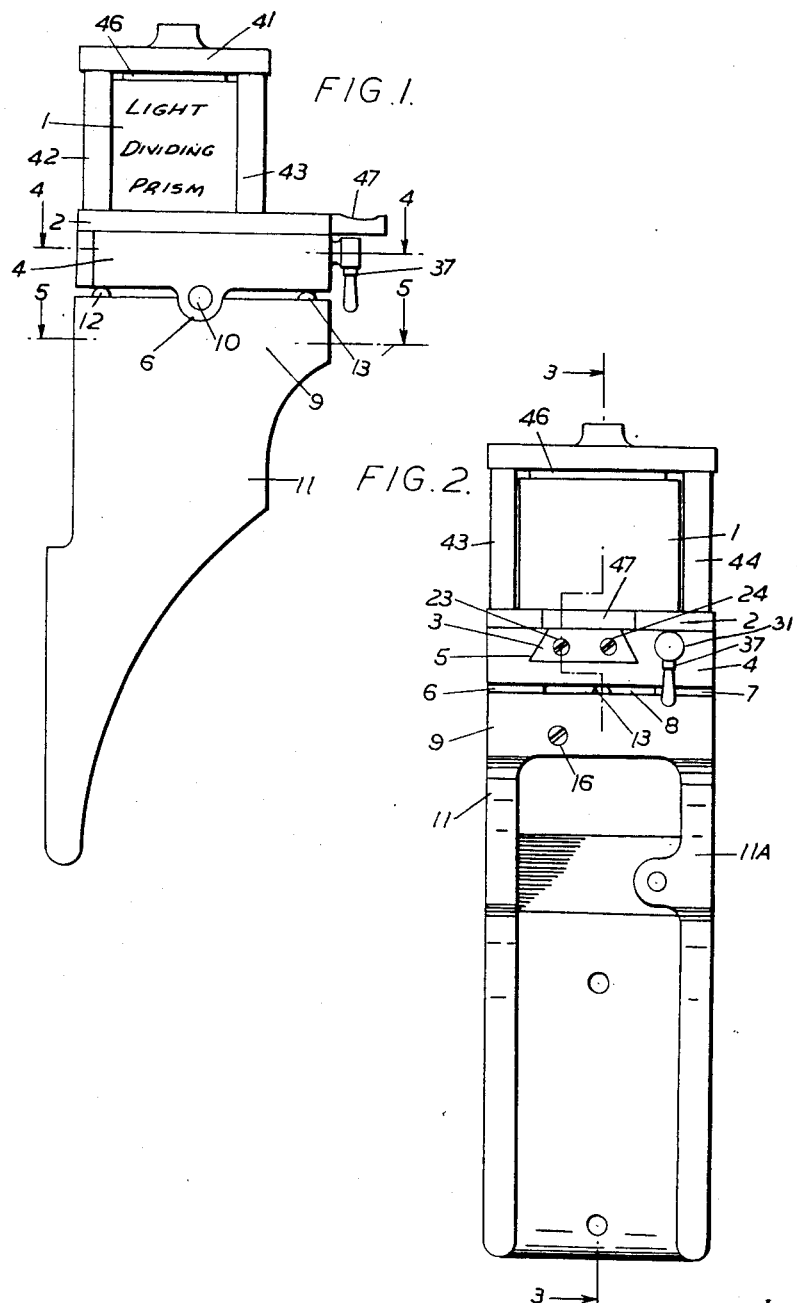

2,614,452

UNITED STATES PATENT OFFICE 2,614,452

LIGHT-DIVIDING SYSTEM

Jack Howard Coote, Teddington, and Gilbert Murray, Thames Ditton, England, assignors to British Tricolour Processes Limited, London, England, a British company Application December 27, 1949, Serial No. 135,086
In Great Britain December 30, 1948

8 Claims. (Cl. 88—1)

This invention relates to light dividing systems of the kind that are encountered in colour cameras. In such light-dividing optical systems a light-dividing prism is mounted in fixed relation to an exposure aperture and is adjustable by rocking and by rectilinear movement in relation to a second exposure aperture which is mounted substantially at right angles to the first aperture.

In such systems it has been proposed to mount a prism upon a mounting plate which is rockable upon a knife edge provided upon a support to which a rectilinear movement is imparted by mounting said support in an eccentric bush sunk in a recess provided in a bracket which is fixed in relation to said other exposure aperture. Accordingly in order to effect any required rectilineal displacement of the knife edge of the support it is necessary in the prior proposal referred to, to remove entirely the mounting plate and the support so as to have access to the eccentric bush for the purpose of adjustment.

The object of the present invention is to permit such rectilineal movement to be effected without removing the mounting plate.

According to the present invention a light-dividing system of the kind described is provided having a mounting plate slidable rectilinearly on and in relation to a rockable support, movement of the plate in relation to its support being effected through adjustment means which are accessible without removing the mounting plate.

According to a feature of the invention the support for the mounting plate is rockably supported upon a transverse hinge.

According to a further feature of the invention the degree of rocking of the rockable platform is controlled by two pins adjustable in height, one disposed upon each side of the axis about which the platform rocks.

The invention will now be described as applied to a camera in which a prism block is mounted so as to reflect and transmit light to two aperture plates mounted at right angles to each other.

In the accompanying drawings:

Fig. 1 is a front view of the prism mounting:

Fig. 2 is a side view of the prism mounting:

Fig. 3 is a sectional view along the line 3—3' of Fig. 2:

Fig. 4 is a sectional view along the line 4—4' of Fig. 1 and

Fig. 5 is a sectional view along the line 5—5' of Fig. 1.

A prism block 1 is mounted upon a plate 2 which carries a dovetail portion 3 (Fig. 2) upon its under side. The plate 2, which has an extending handle portion 47, is slidably mounted upon the upper side of a rockable platform 4, the dovetail portion 3 sliding in a corresponding recess 5 in platform 4. The platform 4 carries upon its under side a pair of arcuate lugs 6, 7 which co-operate with a corresponding central arcuate lug 8 carried upon the upper side of the base 9. A pin 10 passes through holes in each of the lugs 6, 7 and 8 and permits rotatable movement of the platform 4 about the axis of the pin. The base 9 is supported by webs 11, 11A.

Within the base 9 there are mounted, upon opposite sides of the axis of the pin 10, height adjusting pins 12, 13. The upper ends of pins 12, 13 are ball pointed and the surfaces thereof normally make contact with the under surface of platform 4. The lower ends of pins 12, 13 respectively co-operate with the tapered portions of two rods 14, 15 which have finely threaded heads 16, 17 and which are mounted in base 9 (Fig. 5). As shown in Fig. 5 the rods 14, 15 are so disposed within base 9 that the heads 16, 17 thereof emerge at adjacent faces of the base 9: such an arrangement is not necessary however as pointed out hereinafter. Manual adjustment of the rods 14, 15 serves to rotate the platform 4, and with it the prism block 1, about the axis of the pin 10 and it can be locked in any desired position.

Referring to Fig. 1 the two film gates of the camera may be conveniently considered as a "straight through" film gate located immediately to the rear of and with the exposure aperture in substantial optical alignment with the prism block 1 since light passes straight through the prism block to be incident on film exposed in this film gate and a "reflected" film gate located to the left of base 9 and platform 4 and with the exposure aperture in substantial optical alignment with the prism block 1 since light is reflected at the partially reflecting surface in the prism block to be incident upon film exposed in this film gate. It will be understood that these film gates may be mounted within the camera in any suitable manner. The general arrangement may be that described in connection with copending application No. 28,837 filed 24th May, 1948, now Patent No. 2,567,492.

The base plate 9 and its supporting webs 11, 11A are mounted upon a plate (not shown) within the camera by means of screws (not shown) and the horizontal distance between plate 2 and the "reflected" film gate is adjusted by means of an adjustable screw 23, carried within the dovetail portion 3 of plate 2 (Fig. 4). Screw 23 passes right through the portion 3 of plate 2 and ends in a ball-point 25, which when the apparatus is mounted for use has its surface in contact with a stop 27 which is mounted upon the "reflected" film gate end of platform 4 (Fig. 3) by means of screws 21, 22. Manual adjustment of screw 23, when the screw is in contact with the stop, varies the position of plate 2 with respect to platform 4 and hence its horizontal distance from the "reflected" film gate. A locking screw 24, also carried within the dovetail portion 3 of plate 2, is shorter than screw 23 and terminates in a tapered head 26. The tapered head coacts with a distance piece 28, also located in the dovetail portion 3 of plate 2, which has its opposite face in sliding contact with the surface of screw 23. Consequently rotation of screw 24 which moves distance piece 28 towards screw 23 enables screw 23 to be locked and thus fixes the distance between plate 2 and the "reflected" film gate.

When the horizontal distance between plate 2 and the "reflected" film gate has been fixed as described above it still requires to be locked in position in the dovetail mounting. This may be accomplished as follows. A trapezoidal recess 29 is provided in the body of platform 4 abutting on the dovetail portion of the adjustable platform and a trapezoidal distance piece or block 30 is mounted in recess 29. The length of distance piece 30 is slightly less than that of recess 29 and the end planes of the distance piece are parallel with the end planes of recess 29. The greatest width of distance piece 30 is slightly less than the greatest width of recess 29. A screw threaded thimble 31 is provided, mounted in the body of platform 4, and the thread thereof coacts with a corresponding thread 32 in the portion of the body of the platform 4 remote from the "reflected" film gate. A rod 33 makes sliding contact with the inside of thimble 31, passes through bearing 34 in distance piece 30 and terminates in a bearing 35 in platform 4. The cross-section of the bearing 34 in distance piece 30 at the end remote from the thimble and the cross section of the adjoining portion of bearing 35 are enlarged sufficiently to accommodate a coiled spring 36 which serves to urge the distance piece 30 towards and into contact with thimble 31. Thimble 31 is provided with a handle 37 by means of which it may be rotated and the end remote from the handle fits snugly into an enlarged cross-section of bearing 34 whilst the action of said spring 36 ensures that the end of the thimble remote from the handle is in contact with the surface of the enlarged cross section in bearing 34.

The axis of the rod 33 makes a small angle with the dovetail portion 3 of plate 2. Rotation of thimble 31 urges the trapezoidal block 30 rearwards against the spring 36 and in so doing effects lateral displacement thereof towards the dovetail, with which it ultimately makes contact and finally upon further rotation, effects frictional locking. By reversing the rotation of thimble 31 the action of the coiled spring 36 unlocks the dovetail and the parts thereof are then free to move relative to each other.

Thus by manual manipulation of no more than five readily accessible elements the position of the platform carrying the prism can be readily adjusted and, when the necessary adjustments have been made, it can be locked in the desired position.

The prism block 1 is held in position upon plate 2 by means of a clamping screw 40 which is mounted in an upper plate 41 supported upon corner posts 42, 43, 44 and 45. A clamping pad 46 is interposed between the lower end of screw 40 and the upper surface of the prism block 1.

It should be noted that plate 2 and platform 4 have a length greater than the width of the "straight through" film gate and that the end 17 of screw 15 is, in the embodiment of the invention just described, located in that part of platform 4 which extends beyond the film gate. However, the ends 16, 17 of screws 14, 15 may both emerge at the same face of platform 4.

Various modifications may be made in the apparatus described. Thus the locking for the dovetail mounting may be by means of a manually operated rod or screw having threaded portions engaging threaded bearings in platform 4 upon both sides of the trapezoidal block 30. Alternatively only the portion of the rod proximate the handle 37 need be threaded whilst the remainder makes bearing contact with the block 30 and the bearing 35 apart from the small space between the block and the bearing where the spring is operative. Instead of employing a coiled spring a leaf spring may be inserted between the rear surface of the block 30 and the rear wall of trapezoidal recess 29.

The slidable dovetail mounting may be reversed i. e. a dovetail portion may be provided upon the upper side of the adjustable platform and this may slide in a corresponding recess in the under side of the prism mounting plate. The locking means for the slidable mounting may then be located in the prism mounting plate but the arrangement described is preferred.

We claim:

1. Means for supporting a light dividing prism between two film gates mounted substantially at right angles to one another comprising a base plate, a rockable platform rockably mounted thereon on a transverse hinge, a pair of height adjustable pins one mounted upon each side of said hinge, a pair of screws having tapered ends mounted in said base plate and having their tapered ends coacting with the lower ends of said height adjustable pins, a mounting plate slidable on said rockable platform substantially at right angles to said transverse hinge, a screw passing through said mounting plate and adapted to cooperate with a distance piece mounted upon said rockable platform for the moving mounting plate relative to the rockable platform and positioning and clamping means for mounting a prism upon said mounting plate.

2. Means for supporting a light dividing prism between two film gates mounted substantially at right angles to one another comprising a base plate, a rockable platform rockably mounted thereon on a transverse hinge, a pair of height adjustable pins, one mounted upon each side of said transverse hinge, a mounting plate slidable on said rockable platform in a dovetail mounting substantially at right angles to said transverse hinge, a rectilinear screw passing through said mounting plate and adapted to cooperate with a distance piece mounted upon said rockable platform for adjusting the position of said mounting plate relative to said rockable platform and positioning and clamping means for mounting a prism upon said mounting plate.

3. Means for supporting a light dividing prism between two film gates mounted substantially at right angles to one another comprising a base plate, a rockable platform rockably mounted thereon on a transverse hinge, a pair of height adjustable pins, one mounted upon each side of said hinge, a pair of screws having tapered ends mounted in said base plate and having their tapered ends coacting with the lower ends of said height adjustable pins, a mounting plate slidable on said rockable platform in a dovetail mounting substantially at right angles to said transverse hinge, a rectilinear screw passing through said mounting plate and adapted to cooperate with a distance piece mounted upon said rockable platform for adjusting the position of said mounting plate relative to said rockable platform and positioning and clamping means for mounting a prism upon said mounting plate.

4. Means for supporting a light dividing prism between two film gates mounted substantially at right angles to one another comprising a base plate, a rockable platform rockably mounted thereon on a transverse hinge, a pair of height adjustable pins one mounted upon each side of said hinge, a pair of screws having tapered ends mounted in said base plate and having their tapered ends coacting with the lower ends of said height adjustable pins, a mounting plate slidable on said rockable platform in a dovetail mounting substantially at right angles to said transverse hinge, a rectilinear screw passing through said mounting plate and adapted to cooperate with a distance piece mounted upon said rockable platform for adjusting the position of said mounting plate relative to said rockable platform, a second screw in said mounting plate, a laterally displaceable member in said mounting plate adapted to coact with said second screw and by lateral displacement lock said rectilinear screw and positioning and clamping means for mounting a prism upon said mounting plate.

5. Means for supporting a light dividing prism between two film gates mounted substantially at right angles to one another comprising a base plate, a rockable platform mounted thereon on a transverse hinge, a pair of height adjustable pins one mounted upon each side of said hinge, a pair of screws having tapered ends mounted in said base plate and having their tapered ends coacting with the lower ends of said height adjustable pins, a mounting plate slidable on said rockable platform in a dovetail mounting substantially at right angles to said transverse hinge, a laterally displaceable member adapted to lock said slidable mounting plate in predetermined position relative to said rockable platform, a screw adapted to coact with said laterally displaceable member to effect such locking, a rectilinear screw passing through said mounting plate and adapted to cooperate with a distance piece mounted upon said rockable platform for adjusting the position of said mounting plate relative to said rockable platform and positioning and clamping means for mounting a prism upon said mounting plate.

6. Means for supporting a light dividing prism between two film gates mounted substantially at right angles to one another comprising a base plate, a rockable platform mounted thereon on a transverse hinge, a pair of height adjustable pins one mounted upon each side of said hinge, a pair of screws having tapered ends mounted in said base plate and having their tapered ends coacting with the lower ends of said height adjustable pins, a mounting plate slidable upon said rockable platform in a dovetail mounting substantially at right angles to said transverse hinge, a laterally displaceable member adapted to lock said slidable mounting plate in predetermined position relative to said rockable platform, a screw adapted to coact with said laterally displaceable member to effect said locking, a rectilinear screw passing through said mounting plate and adapted to cooperate with a distance piece mounted upon said rockable platform for adjusting the position of said mounting plate relative to said rockable platform, a second screw in said mounting plate, a laterally displaceable member in said mounting plate adapted to coact with said second screw and by lateral displacement lock said rectilinear screw and positioning and clamping means for mounting a prism upon said mounting plate.

7. Means for supporting a light dividing prism between two film gates mounted substantially at right angles to one another comprising a base plate, a rockable platform rockably mounted thereon on a transverse hinge, a pair of height adjustable pins one mounted upon each side of said hinge, a mounting plate slidable on said rockable platform substantially at right angles to said transverse hinge, a distance piece mounted upon said rockable platform, screw means for varying the distance between said mounting plate and said distance piece and positioning and clamping means for mounting a prism upon said mounting plate.

8. Means for supporting a light dividing prism between two film gates mounted substantially at right angles to one another comprising a base plate, a rockable platform rockably mounted thereon on a transverse hinge, a pair of height adjustable pins one mounted upon each side of said hinge, a mounting plate slidable on said rockable platform substantially at right angles to said transverse hinge, a laterally displaceable member adapted to lock said slidable mounting plate in predetermined position relative to said rockable platform, a screw adapted to coact with said laterally displaceable member to effect such locking and positioning and clamping means for mounting a prism upon said mounting plate.

JACK HOWARD COOTE.
GILBERT MURRAY.

REFERENCES CITED

The following references are of record in the file of this patent:

UNITED STATES PATENTS

| Number | Name | Date |
|---|---|---|
| 964,709 | Swasey | July 19, 1910 |
| 1,741,422 | Kuker | Dec. 31, 1929 |
| 2,050,224 | Gilmore | Aug. 4, 1936 |
| 2,072,091 | Ball et al. | Mar. 2, 1937 |
| 2,135,870 | Fassin | Nov. 8, 1938 |
| 2,306,853 | Wittig | Dec. 29, 1942 |

FOREIGN PATENTS

| Number | Country | Date |
|---|---|---|
| 523,756 | France | Apr. 28, 1921 |